United States Patent [19]

Grady

[11] Patent Number: 4,560,312

[45] Date of Patent: Dec. 24, 1985

[54] STUD AND SCREW RIVET FASTENER

[76] Inventor: James H. Grady, 10788 Highland Rd., Milford, Mich. 48042

[21] Appl. No.: 465,875

[22] Filed: Feb. 11, 1983

Related U.S. Application Data

[63] Continuation of Ser. No. 182,667, Aug. 29, 1980, which is a continuation-in-part of Ser. No. 884,650, Mar. 8, 1978, abandoned.

[51] Int. Cl.$^4$ .............................................. F16B 15/04
[52] U.S. Cl. ..................................................... 411/55
[58] Field of Search ................. 411/34, 29, 44, 55, 411/57, 60, 61, 70, 43, 386, 387, 403, 533

[56] References Cited

U.S. PATENT DOCUMENTS

| | | | |
|---|---|---|---|
| 271,026 | 1/1883 | Bradford | 411/257 |
| 960,244 | 6/1910 | Allen | 411/403 X |
| 1,232,274 | 7/1917 | Gay | 411/50 |
| 1,342,201 | 6/1920 | Beckwith | 411/29 |
| 2,139,167 | 12/1938 | Marshall | 411/55 |
| 2,408,559 | 10/1946 | Keating | 411/17 |
| 2,469,349 | 5/1949 | Zeidler | 411/57 |
| 3,149,530 | 9/1964 | Kolec | 411/70 |
| 3,247,754 | 4/1966 | Bieser | 411/29 |
| 3,277,770 | 10/1966 | McCulloch | 411/60 |
| 3,835,615 | 9/1974 | King, Jr. | 411/368 X |
| 4,012,984 | 3/1977 | Matuschek | 411/34 |
| 4,026,186 | 5/1977 | Williams | 411/29 |

FOREIGN PATENT DOCUMENTS

| | | | |
|---|---|---|---|
| 24874 | 8/1919 | Denmark | 411/55 |
| 1221056 | 7/1966 | Fed. Rep. of Germany | 411/29 |
| Ad.85165 | 5/1965 | France | 411/29 |
| 0002441 | 1/1914 | United Kingdom | 411/533 |
| 553124 | 5/1943 | United Kingdom | 411/50 |
| 567274 | 2/1945 | United Kingdom | 411/55 |
| 743651 | 1/1956 | United Kingdom | 411/55 |
| 1364234 | 8/1974 | United Kingdom | 411/50 |
| 0462941 | 5/1975 | U.S.S.R. | 411/55 |

*Primary Examiner*—Thomas J. Holko
*Attorney, Agent, or Firm*—Barnes, Kisselle, Raisch, Choate, Whittemore & Hulbert

[57] ABSTRACT

A self-heading stud and screw rivet fastener with an elongated shank having a socket at one end, a threaded portion adjacent the socket end, an enlarged head secured to or formed on its other end, and a central reduced diameter portion. A tubular sleeve and a washer providing a radial flange at one end of the sleeve are positioned around the reduced diameter portion of the shank. Preferably, the washer and sleeve are a one-piece annulus. The diameter of the sleeve through bore is less than either the enlarged head or the threaded portion of the shank so that the annulus is centrally entrapped on the shank. By inserting the fastener into a hole in a workpiece, using the socket to hold the shank from rotation, and tightening a nut engaging the threaded portion of the shank, the enlarged head is drawn toward and into the annulus to deform it and secure the fastener to the workpiece.

20 Claims, 8 Drawing Figures

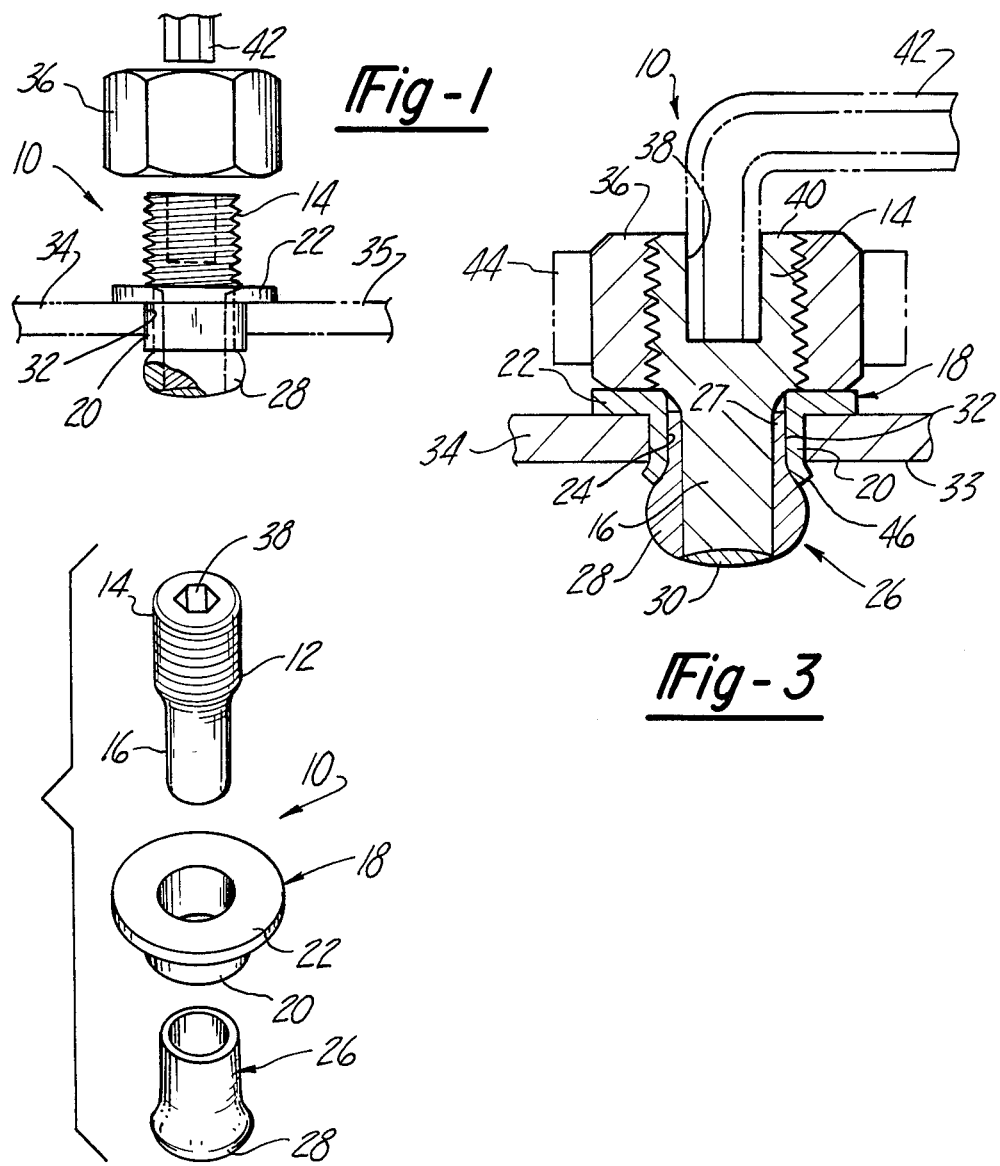

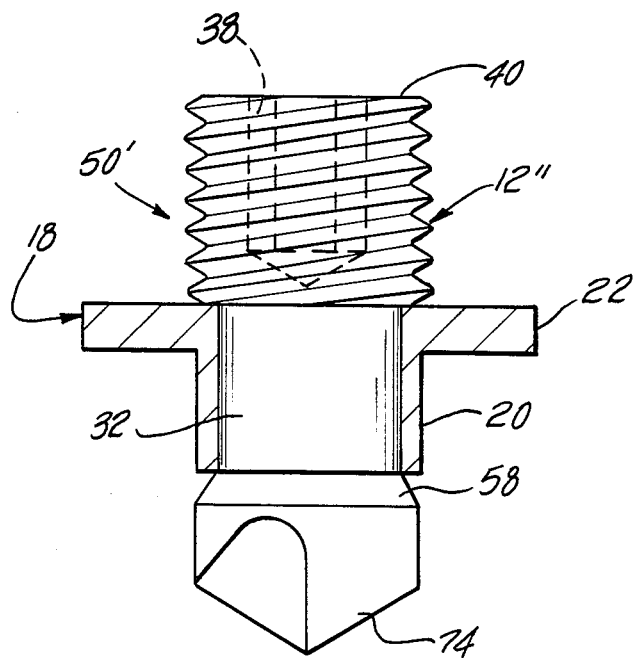
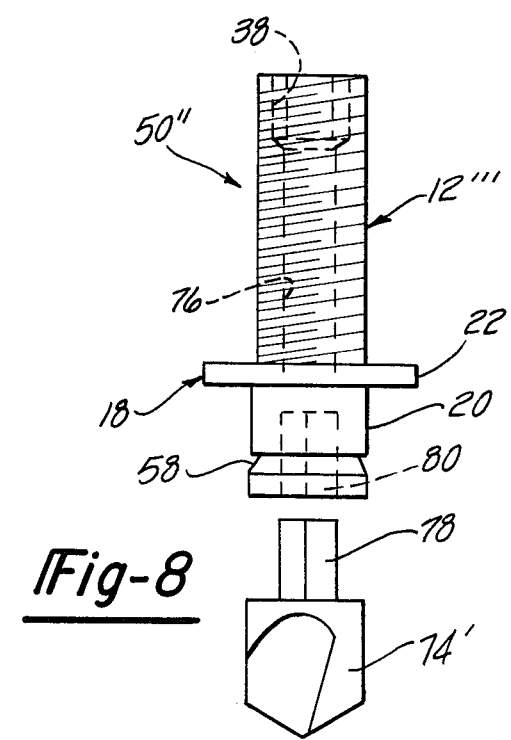
Fig-7
Fig-8

STUD AND SCREW RIVET FASTENER

This application is a continuation of Ser. No. 182,677 filed Aug. 29, 1980 which in turn is a continuation-in-part of Ser. No. 884,650, filed Mar. 8, 1978, both now abandoned.

BACKGROUND OF THE INVENTION

I. Field of the Invention

The present invention relates to fasteners and more particularly, to a fastener with a self-heading stud and screw rivet.

II. Description of the Prior Art

There are a number of previously known self-heading bolts particularly adapted for securement in a hole which is accessible from only one side. Two such self-heading bolts are disclosed in British Pat. Nos. 12,795 and 567,274.

These previously known self-heading bolts typically include four separable pieces, namely, a threaded shank having an enlarged head formed on one end, a sleeve, a washer, and a nut. The sleeve and washer are first mounted over the shank after which a nut threadably engages the shank. Then the shank is inserted through a hole in a workpiece. Rotation of the nut while holding the shank fast draws the enlarged head into and deforms the sleeve and prevents the retraction of the sleeve and shank from the hole.

These previously known self-heading bolts, however, are disadvantageous in a number of different respects, including control and ease of installation and fastening ability. First, due to the four separable components for each self-heading bolt, the assembly of the self-heading bolt is unnecessarily time-consuming and the resultant assembly is difficult to install, particularly when the hole is hard to reach. Moreover, due to the multiplicity of the components, individual components are prone to and easily become lost prior to the installation.

A still further disadvantge of these previously known self-heading bolts is that the sleeve must necessarily be made of a relatively malleable material so that the enlarged head of the shank can easily deform it. Due to its malleability, however, the upper end of the sleeve is oftentimes drawn into or between the nut and shank threads when a high torque is applied on the nut. This, of course, adversely affects the torque-clamp load relationship, destroys the sleeve, and oftentimes requires replacement of the entire self-heading bolt.

A still further disadvantage of these previously known self-heading bolts is that the bolt itself is not secured in the hole or holes, but rather only the retraction of the bolt from the hole is prevented by the deformed sleeve. Consequently, upon removal of the nut from the shank, the shank can easily fall through the blind hole and become lost and require a new sleeve and a new bolt.

SUMMARY OF THE INVENTION

The present invention provides a self-heading stud and screw rivet fastener which overcomes all of the above mentioned disadvantages of the previously known self-heading bolts.

In brief, a self-heading stud and screw rivet fastener, according to the present invention, comprises an elongated shank having a restrainer socket at one end, a threaded portion adjacent such end, a central reduced diameter portion, and an enlarged head adjacent its other end. A tubular sleeve and a washer providing a radial flange at one end of the sleeve are positioned around the reduced diameter portion of the shank. Preferably, the washer and sleeve are in one piece. The diameter of the bore through the washer and sleeve is smaller than the outside diameter of both the shank threaded portion and enlarged head so that they are substantially centrally entrapped on the shank.

In use, the enlarged head and tubular sleeve are inserted through a hole in a workpiece to which the fastener is to be attached. Thereafter, a nut engaging the threaded portion of the shank is tightened which causes the enlarged head to deform the tubular sleeve and thus securely attach the shank to the hole in the workpiece. Even upon subsequent removal of the nut from the shank, the fastener remains attached to the workpiece. The fastener may be installled by use of either simple hand tools or a power driven assembly tool or gun.

Objects, features, and advantages of this invention are to provide a combined stud and screw rivet fastener which can be installed from one side of the workpiece; positively limits penetration into the hole, can be readily and easily installed with ordinary hand tools and, hence, is highly suitable for home use; can be easily and quickly installed by one hand in one continuous operation with an appropriate power tool; can include a drill or reamer to easily and quickly form the correct size hole as an initial part of being installed by one hand in one operation with a power tool; enables the nut to be easily and accurately guided, piloted, and threaded along the stud by a power tool without cross-threading; is positively engaged and driven without slippage of the tools or any rotation of the fastener in the hole when being installed; is self-aligning with and centering and squaring in the hole; can be installed where it engages only the circumferential side wall of a hole in a workpiece; can produce a significantly greater clamping force than prior fasteners of comparable size and weight; has improved uniformity, control, and repeatability of the clamp load from one fastener to the next of the same size and construction; has improved accuracy, control, and repeatability of the clamp load by control of the amount of torque applied to the nut compared to prior fasteners; provides accurate and repeatable control of the force applied to expand the sleeve; permits the ratio of the force applied to expand the sleeve to the clamp load to be multiplied and readily varied and controlled; when installed, provides intimate metal to metal contact resulting in a fluid tight seal even under high pressure, improved corrosion resistance, and an electrically conductive path; provides permanent attachment to one workpiece while permitting removable assembly thereto of another workpiece; is difficult to remove from the side of a workpiece from which it was inserted and, hence, is highly resistant to being tampered with; can be easily utilized to replace defective fasteners, particularly in devices already in field use; can be used to plug and seal holes; can be constructed and used to provide flow inlets and outlets; can be rapidly and easily installed with a power tool in vessels and lines already under high pressure; can be easily and economically manufactured and assembled, and is rugged, durable, and extremely versatile in use.

BRIEF DESCRIPTION OF THE DRAWINGS

These and other objects, features, and advantages of this invention will be apparent upon perusal of the following detailed description, appended claims, and accompanying drawings in which:

FIG. 1 is a side view of a stud and screw rivet fastener embodying this invention.

FIG. 2 is an exploded view of the fastener of FIG. 1 with the nut removed for clarity.

FIG. 3 is a sectional view of the fastener of FIG. 1 secured to a workpiece.

FIG. 7 is a side view partially in section of another modified fastener embodying this invention with its nut removed.

FIG. 8 is a side view of a further modified fastener embodying this invention with its nut removed.

DETAILED DESCRIPTION OF THE INVENTION

Figure 4:
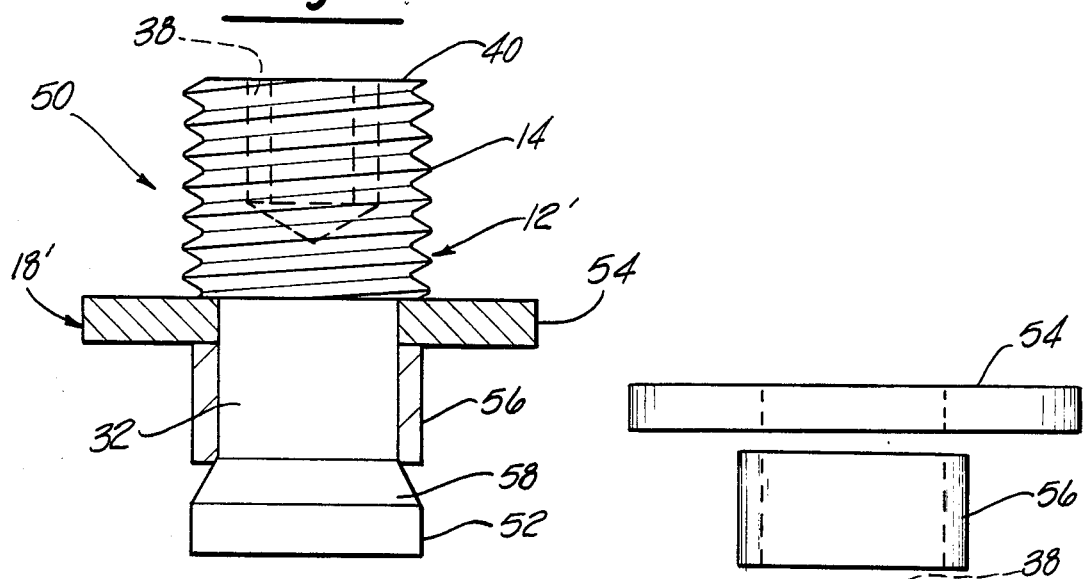
FIG. 4 is a side view partially in section of a modified fastener embodying this invention with its nut removed.

FIGS. 1-3 of the drawings illustrate a self-heading stud and screw rivet fastener 10 embodying this invention with an elongated shank 12 which is generally cylindrical in shape. External threads 14 are formmed about one end of the shank 12 while the other end 16 of the shank 12 is of a smaller diameter than the shank threaded portion 14.

Preferably, a one-piece, continuous and uninterrupted annulus 18 is provided and comprises a tubular sleeve 20 made of a malleable material and having a radial flange 22 at one end which extends radially outwardly from the sleeve 20. The annulus 18 is positioned over the end 16 of the shank so that the radial flange 22 abuts against the inner or lower end of the shank threaded portion 14. In addition, the diameter of the sleeve through bore 24 is less than the outside diameter of the shank threaded portion 14 so that the shank threaded portion 14 cannot pass through the annulus 18.

A tubular cap 26 having an enlarged head 28 at one end is coaxially positioned over the end 16 of the shank so that the other end 27 of the cap 26 is inserted through a portion of the sleeve through bore 24. The cap 26 is then secured to the shank 12 by any appropriate means, such as by silver soldering or brazing 30. The shank 12 in combination with the cap 26 forms a central reduced diameter portion 32 around which the annulus 18 is positioned and permanently retained. Moreover, the annulus through bore 24 is smaller in diameter than the outside diameter of the enlarged head 28 so that the annulus 18 is entrapped between the enlarged head 28 and the shank threaded portion 14.

The fastener 10 may be secured in a hole in a workpiece 34 by expanding or flaring out the lower end of the sleeve 20. To expand the sleeve, the head 28 of the shank 12 is drawn into the sleeve by a nut 36 received on the threaded portion 14 of the shank. To prevent rotation of the shank of the fastener 10 when nut 36 is being tightened, an Allen-head socket 38 is provided in the end 40 of the shank. Preferably, the outside diameters of the enlarged head 28, the annulus sleeve 20, and the threaded portion 14 are substantially the same so that the required size of the workpiece hole 32 can be conveniently the same as the nominal thread size of the shank threaded portion 14.

As shown in FIG. 1, in securing fastener 10 to a workpiece, the enlarged head 28 and sleeve 20 are first inserted through the hole in the workpiece 34 until the radial flange 22 abuts against one side 35 of the workpiece 34 and prevents further inward travel of the fastener. As shown in FIG. 3, to prevent rotation of the shank 12 when the nut 36 is tightened, an appropriate Allen-head wrench 42 is inserted in the socket 38 in the threaded axial end 40 of the shank.

Upon tightening the nut 36 with a suitable wrench 44, the enlarged head 28 is drawn upwardly toward and into the lower end of the sleeve 20. In doing so, the enlarged head 28 flares the lower axial end of the sleeve 20 outwardly as shown at 46 and around the bottom side 33 of the workpiece hole so that the annulus 18 is secured to and entraps the workpiece 34 between its radial flange 22 and its flared portion 46. Since the annulus 18 is entrapped substantially centrally on the shank 12, the fastener 10 in turn is firmly secured to the workpiece 34 even upon subsequent removal of the nut 36. Furthermore, the fastener 10 is aligned, centered, and squared in the hole by the cooperation of the flange 22, nut 36, threaded portion 14, and flared sleeve of the annulus.

Figure 5:
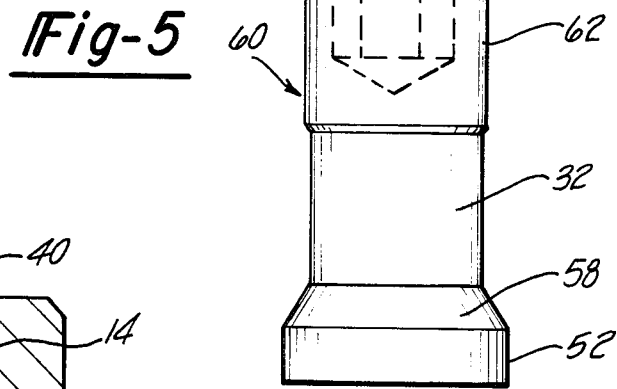
FIG. 5 is an exploded view illustrating some of the component parts of the fastener of FIG. 4 in an intermediate state of fabrication thereof.
Figure 6:
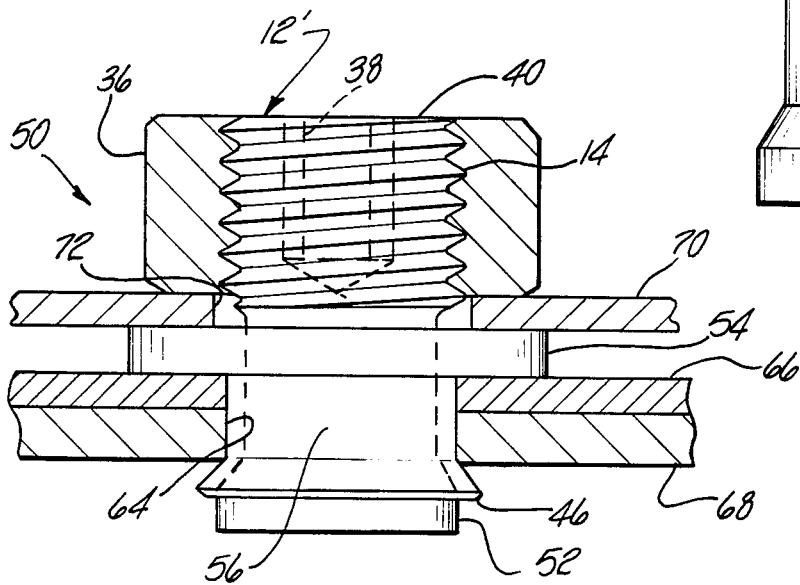
FIG. 6 is a side view partially in section of the fastener of FIG. 4 securing together a plurality of plates.

FIGS. 4-6 illustrate a modified fastener 50 embodying this invention with a one-piece shank 12' having a threaded portion 14 adjacent one end, a centrally reduced shank portion 32, and an enlarged head 52 adjacent the other end. Preferably, to assure that the nut 36 cannot bottom out on the shank and thereby adversely affect the torque-clamp load relationship of the fastener, the diameter of the reduced shank portion 32 is slightly smaller than the minor diameter of the threads of the nut 36. An annulus 18' comprising a separate continuous, uninterrupted washer 54 and an abutting continuous and uninterrupted tubular sleeve 56 of a malleable metal is received on the reduced diameter portion 32 of the shank. The lower end of the sleeve 56 is generally radially outwardly expanded by a generally frustroconical surface 58 on the enlarged head 52 which is inclined at an acute included angle to the axis of the shank. The ratio of the force applied by conical surface 58 to expand sleeve 56 to the clamping force produced by tightening the nut 36 of the fastener can be varied and controlled by changing the angle of inclination of the conical surface to the axis of the shank.

As shown in FIG. 5, the fastener 50 may be made by forming a shaft piece 60 with the head 52 and its conical surface 58 on one end, the reduced diameter portion 32 on its central portion, the hexagonal socket 38 in its other end, and preferably, a slightly enlarged portion 62 adjacent its other end. Sleeve 56 and washer 54 are assembled over the shaft piece 60 and then threads are rolled on the cylindrical portion 62 to provide the threaded portion 14 with an increased outside diameter which permanently entraps the washer 54 and sleeve 56 of annulus 18' to provide the completed shank 12'. Preferably, the inside diameter of the sleeve is also slightly reduced such as by rolling the sleeve between a plurality of circumferentially spaced rolls bearing on the outer periphery of the sleeve and forced radially inward while the sleeve is rotated. This is the presently preferred way of mass producing large numbers of fasteners embodying this invention.

Fastener 50 may be secured to a workpiece by using hand tools as described in connection with fastener 10 or it may be inserted into a hole and secured by one hand in one continuous operation utilizing an appropriate power tool. The nut 36 can be threaded and tightened on the shank by a drive socket engaging the nut and rotated by the power tool. The nut can be guided and piloted unto the shank by a generally cylindrical member carried by the power tool in generally coaxial relation with the socket. The outside diameter of the cylindrical member is slightly smaller than the minor diameter of the threads of the nut.

The cylindrical member can be piloted on the shank and the shank restrained from rotating by a hexagonal member fixed to and projecting coaxially from the cylindrical member and slidably received in the socket 38 of the shank. To enable the socket to engage the nut as it advances on the shaft while being tightened, the cylindrical member is carried by the power tool and biased so that it will yieldably retract axially with respect to the socket to permit the socket to advance axially with the nut along the shank.

As shown in FIG. 6, the fastener 50 can secure together a plurality of plates. The fastener 50 can be inserted into a hole 64 through two overlapping plates 66 and 68 and nut 36 tightened to flare the lower end of sleeve 56 outwardly as shown at 46 and secure together the plates. An additional plate 70 with a through hole 72 can also be removably connected to the outer plates by being received over the threaded portion 14 of the shank between the washer 54 and the nut 36.

Since the washer 54 and sleeve 56 forming annulus 18' are separate pieces, plates 66 and 68 are tightly clamped together only so long as nut 36 remains tightly screwed on the threaded portion of the shank. When nut 36 is loosened or removed from the shank, plates 66 and 68 will still be loosely connected together by the fastener 50, and the fastener cannot be removed from hole 64, because the plates are entrapped between the flared poortion 46 of the sleeve and the washer. If it is preferred that the plates 66 and 68 remain rightly clamped together when nut 36 is removed from the fastener, the one-piece annulus 18 can be used in lieu of the two-piece annulus 18' in the construction of the fastener.

FIG. 7 illustrates a modified fastener 50' embodying this invention which has a one-piece annulus 18 and is constructed and arranged to drill or ream a hole in a workpiece in which the fastener is being inserted. When fastener 50' is driven with an appropriate power tool in essentially one continuous operation, a hole can be bored or reamed in a workpiece, the head and sleeve of the fastener inserted into the hole, the nut guided, piloted, and threaded onto the shank, and the nut tightened to secure the fastener in the hole. To drill or ream a hole of appropriate size, the shank 12" of the fastener 50' has an integral drill 74 formed on its lower end in coaxial relation with the shank.

To drill a hole in the workpiece, shank 12" is rotated by the power tool which is coupled to the shank through its socket 38. The power tool rotates its cylindrical member to drive the drill. When drilling of the hole is completed, the power tool locks the cylindrical member so it does not rotate and then rotates its socket to thread and tighten the nut, thereby securing the fastener in the hole of the workpiece.

FIG. 8 illustrates a modified fastener 50" embodying this invention which is used to provide a fluid inlet or outlet passage in a vessel, pipeline, or the like. Fastener 50" is essentially the same as fastener 50' except that it has a bit 74' which can be disconnected from its shank 12''' and a fluid passage 76 which extends generally axially through the shank. Drill 74' has a drive tang 78 with a square or other non-circular cross-section which is frictionally received in a mating socket 80 in the lower end of the shank.

In use, fastener 50" is inserted into and secured to a workpiece in the same manner as fastener 50'. After the fastener is secured to the workpiece, drill 74' is disengaged and removed from the fastener by inserting a rod through passage 76 to bear on and push the drive tang 78 of the drill out of the socket 80 of the fastener. When the rod is removed, the unobstructed passage 76 communicates with both sides of the workpiece to provide a fluid inlet or outlet.

From the foregoing, it can be seen that a self-heading stud and screw rivet fastener embodying this invention has many advantages over previously known self-heading bolts. Since the enlarged head, annulus, and shank are initially assembled together, installation of the fastener is greatly facilitated. Moreover, the possibility of loss of the individual components of the fastener is virtually eliminated due to the entrapment of the annulus on the shank.

Furthermore, upon attachment of the fastener in a hole of a workpiece, it remains attached to the workpiece despite subsequent removal of the nut. Thus, unlike previously known devices, the loss of the shank through the workpiece hole either during the installation of the fastener or upon subsequent removal of the nut is totally prevented.

In practical applications, the fastener has excellent torque and clamp load characteristics and when desired, can be installed without the requirement of special tools. Moreover, it provides an excellent electrical terminal for vehicular bodies or the like and also forms a fluid tight connection between the fastener and the workpiece. Furthermore, the fastener is virtually tamper proof since, once installed, it cannot easily be removed from the workpiece.

With an appropriate power tool, the nut can be rapidly guided, piloted, and tightened without cross-threading, and the fastener can be quickly and easily installed with one hand in one continuous operation. In addition, the fastener can be constructed to drill or ream the hole in which it is secured as part of essentially one continuous installation operation with a power tool. If desired, the fastener can also be constructed to provide a fluid inlet or outlet. These and many other feature and advantages of this invention are apparent from the embodiments described herein and in the appended claims.

The described embodiments are intended to be illustrative and not limitative of this invention. It is evident that many alternatives, modifications, and variations of this invention will be apparent to those skilled in the art in light of the described embodiments. Accordingly, the invention is intended to embrace all such alternatives, modifications, and variations as fall within the spirit and broad scope of the appended claims.

I claim:

1. A stud and screw rivet fastener comprising: an elongated shank having external threads adjacent one end, a central portion with a diameter reduced with respect to the maximum diameter of said threads, and a head adjacent its other end enlarged with respect to said central portion; a continuous, uninterrupted tubular sleeve of a malleable material received on said central portion of said shank; a continuous, uninterrupted washer permanently received on said central portion of said shank between said tubular sleeve and said threaded portion of said shank, said washer extending radially inward of the outer periphery of said tubular sleeve to overlap the end of said tubular sleeve adjacent said washer and radially outwardly of both said tubular sleeve and said threaded portion of said shank; means permanently retaining said washer and said tubular sleeve on said central portion, said means permanently retaining comprising either forming said enlarged head on said shank or forming said threaded portion on said shank after said washer and said tubular sleeve are reeived on said central portion so that said washer and tubular sleeve are entrapped on said central portion between said enlarged head and said threaded portion of said shank; the outside diameters of said tubular sleeve, and said enlarged head of said shank being generally the same; a nut for threadily engaging the threaded portion of said shank; and restraining means adjacent one end of said shank and adjacent, generally coaxial with and generally radially inwardly of said threaded portion for restraining said shank when rotating said nut on said threaded portion of said shank such that upon insertion of said tubular sleeve into a hole in a workpiece, and tightening of said nut while restraining said shank, said enlarged head of said shank engages and generally radially outwardly permanently deforms a portion of the sleeve adjacent said enlarged head to nondetachably secure the fastener without breaking said shank and to clamp the workpiece between said washer and said deformed portion of said sleeve.

2. The fastener of claim 1 wherein said washer and said tubular sleeve are integral.

3. The fastener of claim 1 wherein said washer and said tubular sleeve are homogeneously integral and in one piece.

4. The fastener of claim 1 wherein said restraining means comprises a socket in said one end of said shank.

5. The fastener of claim 1 wherein said shank including said enlarged head and said threaded portion is in one homogeneously integral piece.

6. The fastener of claim 1 wherein the outside diameters of said threaded portion of said shank, said tubular sleeve, and said enlarged head of said shank are substantially the same.

7. The fastener of claim 1 wherein said nut has generally flat outer peripheral faces constructed and arranged in a hexagonal pattern.

8. The fastener of claim 7 wherein said restraining means comprises a socket recessed in said one end of said shank and having flat faces constructed and arranged in a generally hexagonal pattern.

9. The fastener of claim 1 wherein said enlarged head comprises a separate elongated tubular cap fixed to said shank and having a circumferentially continuous and generally radially enlarged portion relative to said central portion of said shank.

10. The fastener of claim 1 wherein said means permanently retaining comprises after forming said head and prior to forming said threads on said shank, said washer and said tubular sleeve are passed over said one end of said shank and received on said central portion of said shank and, thereafter, threads are formed on said shank to both provide said threaded portion and entrap said washer and said tubular sleeve between said enlarged head and said threaded portion.

11. The fastener of claim 1 wherein said enlarged head comprises a conical surface constructed and arranged to engage for radially outwardly deforming said portion of said tubular sleeve adjacent said enlarged head.

12. The fastener of claim 1 wherein the diameter of said reduced shank portion is smaller than the minor diameter of the threads of said nut.

13. The fastener of claim 1 which also comprises a drill carried by said shank in coaxial relation therewith and ahead of said enlarged head of said shank, said drill being constructed and arranged to rotate with said shank such that rotation thereof can produce a hole in a workpiece into which said tubular sleeve can be inserted by advancement of said shank 14. The fastener of claim 13 wherein said shank and drill are constructed and arranged such that said drill is releasably carried by said shank so that said drill can be disengaged from said shank after the fastener is secured in the hole in the workpiece produced by said drill.

15. The fastener of claim 14 which also comprises a passage within and extending generally axially through said shank.

16. A stud and screw rivet fastener comprising: an elongated shank having external threads adjacent one end, a central portion with a diameter reduced with respect to the maximum diameter of said threads, and a head adjacent its other end enlarged with respect to said central portion; a one-piece, continuous and uniterrupted annulus of a malleable material received on said central portion of said shank means permanently retaining said annulus on said central portion comprising either forming said enlarged head on said shank or forming said threaded portion on said shank after said annulus is received on said central portion so that said annulus is entrapped between said enlarged head and said threaded portion of said shank, said annulus having a tubular sleeve and a flange adjacent one end of said sleeve with a through bore which is smaller in diameter than said enlarged head of said shank and said threaded portion, said flange extending radially outwardly of both said tubular sleeve and said threaded portion of said shank; the outside diameter of said tubular sleeve, and said enlarged head of said shank being generally the same; a nut for threadily engaging the threaded portion of said shank; and restraining means adjacent said one end of said shank and adjacent, generally coaxial with, and generally radially inward of said threaded portion for restraining said shank when rotating said nut on said threaded portion of said shank such that upon insertion of said tubular sleeve into a hole in a workpiece, and tightening of said nut while restraining said shank, said enlarged head of said shank engages and generally radially outwardly permanently deforms a portion of said tubular sleeve adjacent said enlarged head to nondetachably secure the fastener without breaking said shank and to clamp the workpiece between said flange and said deformed portion of said tubular sleeve.

17. The fastener of claim 16 wherein said restraining means comprising a socket in said one end of said shank.

18. The fastener of claim 16 wherein said shank including said enlarged head and said threaded portion is in one homogeneously integral piece.

19. The fastener of claim 16 wherein said means permanently retaining comprises after forming said enlarged head and prior to forming said threads on said shank, said annulus is passed over said one end of said shank and received on said central portion of said shank and, thereafter, threads are formed on said shank to both provide said threaded portion and entrap said annulus between said enlarged head and said threaded portion.

20. The fastener of claim 16 wherein said enlarged head comprises a conical surface constructed and arranged to engage for radially outwardly deforming said portion of said tubular sleeve adjacent said enlarged head.

* * * * *